US008799066B1

(12) United States Patent
Nesladek et al.

(10) Patent No.: US 8,799,066 B1
(45) Date of Patent: Aug. 5, 2014

(54) FACILITATING EMBEDDED DYNAMIC COMMERCIAL OFFERS

(75) Inventors: Christopher D. Nesladek, Mountain View, CA (US); Ricardo Marquez, Mountain View, CA (US); Lisa C. Gevelber, Palo Alto, CA (US); Miriam Geller, San Francisco, CA (US); Gang Wan, Goleta, CA (US); Ashley M. Fernandes, San Leandro, CA (US)

(73) Assignee: Intuit Inc., Mountain View, CA (US)

( * ) Notice: Subject to any disclaimer, the term of this patent is extended or adjusted under 35 U.S.C. 154(b) by 1369 days.

(21) Appl. No.: 11/834,102

(22) Filed: Aug. 6, 2007

(51) Int. Cl.
*G06Q 30/00* (2012.01)
*H04N 7/16* (2011.01)

(52) U.S. Cl.
USPC .......... 705/14.23; 705/14.28; 725/26; 725/27

(58) Field of Classification Search
CPC ........ G06Q 30/02; H04N 20/78; H04N 7/163
USPC ....................... 705/14, 27, 400, 14.23, 14.28; 707/10–20; 345/760; 709/206; 725/26, 725/27
See application file for complete search history.

(56) References Cited

U.S. PATENT DOCUMENTS

| | | | | |
|---|---|---|---|---|
| 7,107,225 | B1 * | 9/2006 | McClung, III | 705/14.35 |
| 2002/0021307 | A1 * | 2/2002 | Glenn et al. | 345/753 |
| 2003/0038840 | A1 * | 2/2003 | Stern | 345/760 |
| 2005/0025348 | A1 * | 2/2005 | Tecu et al. | 382/128 |
| 2005/0177525 | A1 * | 8/2005 | Apple et al. | 705/400 |
| 2006/0149648 | A1 * | 7/2006 | Brown | 705/35 |
| 2007/0112919 | A1 * | 5/2007 | Lyle et al. | 709/206 |
| 2008/0010121 | A1 * | 1/2008 | McIntosh | 705/14 |

* cited by examiner

*Primary Examiner* — Sun Li
(74) *Attorney, Agent, or Firm* — Park, Vaughan, Fleming & Dowler LLP; Steven E. Stupp

(57) ABSTRACT

A system that facilitates providing of commercial offers is described. During operation, this system receives financial information associated with a user of financial software. Then, the system presents an icon corresponding to the commercial offer to the user. This commercial offer is targeted to the user based on a financial history of the user, which includes multiple transactions with multiple commercial establishments. Moreover, the icon exhibits animated behavior which can vary over time, and the user can pursue the commercial offer by interacting with the icon.

19 Claims, 7 Drawing Sheets

FIG. 5

COMMERCIAL OFFER 510-1:
| TIME STAMP 512-1 | CATEGORIES 514-1 | STATE(S) 516-1 | COLOR(S) 518-1 | MOTION(S) 520-1 | ... |

COMMERCIAL OFFER 510-2

FINANCIAL INFORMATION 610-1:
| TIME STAMP 612-1 | FINANCIAL TRANSACTION 614-1 | ITEM(S) PURCHASED 616-1 | COMMERCIAL ESTABLISHMENT(S) 618-1 | CATEGORIES 620-1 | ... |

FINANCIAL INFORMATION 610-2

...

600

FACILITATING EMBEDDED DYNAMIC COMMERCIAL OFFERS

BACKGROUND

The present invention relates to techniques for providing embedded commercial offers. More specifically, the present invention relates to dynamic commercial offers that are embedded in or associated with financial software.

Targeted advertising, in which advertisements and/or commercial offers are provided to customers who are interested in specific products, is becoming an important marketing paradigm. For example, many companies obtain new customers and increase their revenue by providing targeted advertising via the Internet. These advertisements are targeted to specific users based on factors, such as key words in a search query entered by a user, content on a web page being viewed by a user, and/or user preferences. Such factors are indicative of current interests of prospective customers, and thus, increase the relevancy of the advertisements.

Unfortunately, these factors are an indirect indicator of the current interests of the prospective customers. Consequently, the customer capture rate associated with many targeted advertisements remains relatively low.

One approach for improving the relevancy of the advertisements is to determine the interests of the prospective customers based on their past behavior, and in particular, their past purchasing behavior. Presumably, items that customers previously purchased are good predictors of their future interests, and thus, their future purchasing behavior.

However, this approach is often limited in scope, because commercial establishments typically only have access to a limited subset of a customer's purchasing behavior. For example, once the need for a particular item is fulfilled (the customer has just purchase the item), providing advertising for the same item or additional products closely related to the item may be less effective because in the immediate future. This type of pattern becomes more evident when a cumulative history of the customer's purchasing behavior is analyzed, but less evident when only a small sample of the customer's purchasing behavior is considered.

Moreover, many advertisements are also time dependent. For example, a commercial offer may only be valid for a limited time to limit the financial liability associated with the commercial offer and in an attempt to motivate potential customers to make a purchase sooner as opposed to later. However, many existing advertisements are presented in a static format, which may not fully convey an urgency associated with their time dependence.

Therefore, the efficacy of many existing advertisements is limited by a lack of information about a customer's overall purchasing behavior and/or by the use of formats that do not convey the time dependence of these advertisements.

SUMMARY

One embodiment of this invention relates to a system that provides commercial offers. During operation, this system receives financial information associated with a user of financial software. Next, the system presents an icon corresponding to a commercial offer to the user. This commercial offer is targeted to the user based on the financial history of the user, which includes multiple transactions with multiple commercial establishments. Moreover, the icon exhibits animated behavior which can vary over time, and the user can pursue the commercial offer by interacting with the icon.

In some embodiments, the financial information is provided by the user and/or a financial institution. Note that the financial institution may include a credit card company and/or or a bank.

In some embodiments, the animated behavior includes a change of color, a change of shape, and/or a type of motion. Moreover, in some embodiments the animated behavior is based, at least in part, on: feedback from the user and/or a state of the commercial offer. For example, the state may include: a time remaining to accept the commercial offer, an estimated relevancy of the commercial offer to the user, and/or one or more categories associated with the commercial offer.

In some embodiments the financial history includes information associated with: spending on items, categories associated with the items, spending patterns, and/or the commercial establishments that provided the items.

In some embodiments, the icon is included in an embedded slide show or video in the financial software. Moreover, in some embodiments the icon is included in: a taskbar in the financial software and/or a grid that displays multiple icons in the financial software (where a given icon in the multiple icons is associated with a given commercial offer).

In some embodiments, the financial software includes: Quicken™, QuickBooks™ and/or TurboTax™.

In some embodiments, the commercial offer is based on a wish list of items for which the user would like to receive a commercial offer.

Another embodiment relates to a computer program product for use in conjunction with the system. This computer program product may include instructions corresponding to at least some of the above-described operations.

Another embodiment provides a method for providing the commercial offers. This method may perform at least some of the above-described operations.

Another embodiment relates to a graphical user interface which provides the commercial offers in the financial software. This graphical user interface includes a window having one or more icons, where a given icon corresponds to a given commercial offer and exhibits animated behavior which varies over time. This commercial offer is targeted to the user is based on the financial history of the user, which includes multiple transactions with multiple commercial establishments. Moreover, the user can pursue the commercial offer by interacting with the icon.

BRIEF DESCRIPTION OF THE FIGURES

FIG. 5 is a block diagram illustrating a data structure in accordance with an embodiment of the present invention.

FIG. 6 is a block diagram illustrating a data structure in accordance with an embodiment of the present invention.

DETAILED DESCRIPTION

Figure 1:
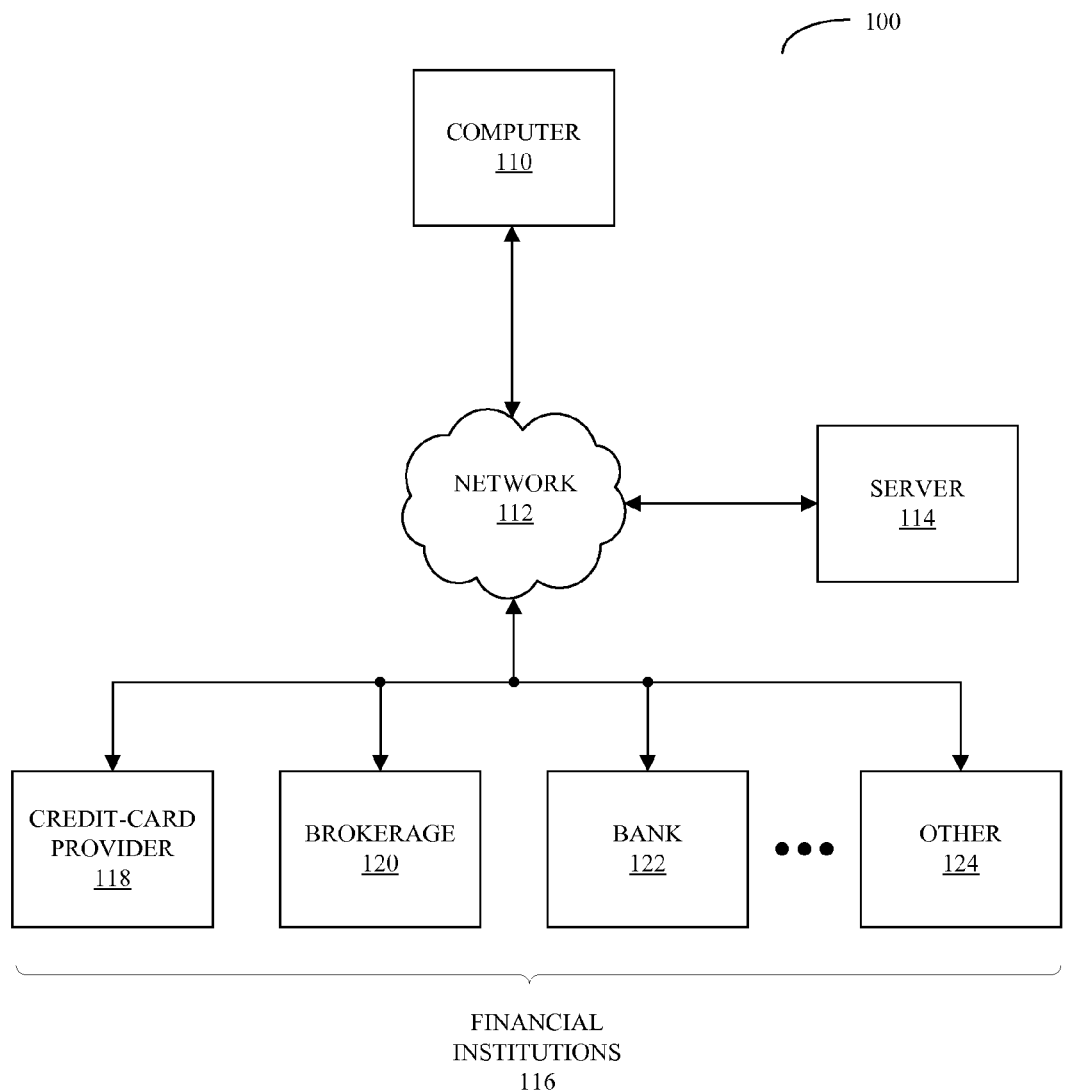
FIG. 1 is a block diagram illustrating a computer system including computers and servers that are networked together in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems, software, and processes may be used to provide commercial offers (such as discounts). In particular, the computer system may present an icon corresponding to a commercial offer to a user of financial software (such Quicken™, QuickBooks™ and/or TurboTax™). Note that the icon may be presented internal to and/or external to the financial software.

This commercial offer may be targeted to the user based on a financial history of the user, which includes multiple transactions with multiple commercial establishments, such as items purchased from vendors. For example, the financial history may include financial information available to the financial software, such as financial information provided by the user and/or a financial institution. Moreover, note that the user can pursue the commercial offer by interacting with the icon.

In some embodiments, the icon exhibits animated behavior which varies over time. For example, the animated behavior may include: a change of color, a change of shape, and/or a type of motion. Moreover, the animated behavior may be based, at least in part, on: feedback from the user, a state of the commercial offer (such as a time remaining to accept the commercial offer), and/or a characteristic or personal trait associated with the commercial offer. Thus, the icon (and the commercial offer) may be presented in a dynamic (i.e., lively) and/or personalized fashion.

These techniques may be implemented as a stand-alone software application, or as a program module or subroutine in another application. Furthermore, at least a portion of the program may be configured to execute on a client computer (such as a personal computer, a laptop computer, cell phone, PDA, or other device capable of manipulating computer readable data) or remotely from a client computer via associated computing systems over a network (such as the Internet, Intranet, LAN, WAN, MAN, or combination of networks, or other technology enabling communication between computing systems). Therefore, the information used to provide the icons (and thus the commercial offers) may be stored locally (for example, on a local computer) and/or remotely (for example, on a computer or server that is accessed via a network).

By combining contextual information (such as the detailed financial history of the user which is available to the financial software) with the dynamic animated behavior of the icons, these techniques may improve the relevancy of the commercial offers and the situational awareness of the user to the temporal importance of particular commercial offers. Consequently, these techniques may improve the acceptance rate of the commercial offers, thereby improving the users' experience and satisfaction when using the financial software, as well as improving the revenue of the companies associated with the commercial offers.

We now describe embodiments of systems, devices, and processes for providing commercial offers. FIG. 1 presents a block diagram illustrating an embodiment of a computer system 100 including computers and servers that are networked together. A user may use financial software that executes on a computer 110. For example, the financial software may be a stand-alone application on the computer 110 and/or may be embedded in another application. Therefore, in some embodiments the financial software may be included or embedded in income-tax preparation software and/or financial-accounting software.

In some embodiments, the income-tax software includes: TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return. Furthermore, in some embodiments the financial-accounting software includes payroll-accounting software, such as QuickBooks™ (from Intuit, Inc., of Mountain View, Calif.), PeachTree Complete™ (from the Sage Group PLC, of London, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Small Business Manager™ (from Microsoft Corporation, of Redmond, Wash.), Simply Accounting™ (from the Sage Group PLC, of London, the United Kingdom), CYMA IV Accounting™ (from CYMA Systems, Inc., of Temple, Ariz.), DacEasy™ (from Sage Software SB, Inc., of Lawrenceville, Ga.), Microsoft Money™ (from Microsoft Corporation, of Redmond, Wash.), and/or other financial-accounting software capable of processing payroll information. Finally, in some embodiments the financial-accounting software includes financial-planning software, such as Quicken™ (from Intuit, Inc., of Mountain View, Calif.), Microsoft Money™ (from Microsoft Corporation, of Redmond, Wash.), SplashMoney™ (from SplashData, Inc., Los Gatos, Calif.), Mvelopes™ (from In2M, Inc., Draper, Utah), and/or open-source applications such as Gnucash™, PLCash™, Budget™ (from Snowmint Creative Solutions, LLC), and/or other financial-planning software capable of processing financial information.

While the financial software may be resident on the computer 110, other embodiments may utilize a financial-software tool that is embedded in a web page (once again, either as a stand-alone application or as a portion of another application). This web page may be provided by a server 114 via network 112. In an exemplary embodiment, the financial-software tool is a software package written in JavaScript™ (i.e., the financial-software tool includes programs or procedures containing JavaScript instructions), ECMAScript (the specification for which is published by the European Computer Manufacturers Association International), VBScript™ (a trademark of Microsoft, Inc.) or any other client or server-side scripting language. In other words, the financial-software tool may include programs or procedures containing JavaScript, ECMAScript instructions, VBScript instructions, or instructions in another programming language suitable for rendering by a browser or another client application on the computer 110.

This financial software may aggregate financial information about one or more users of the financial software. For example, the financial information may be provided by a user of the financial software or by one or more financial institutions 116. Note that the one or more financial institutions 116 may include: a credit-card provider 118, a brokerage 120, a bank 122, and/or another financial institution 124 or governmental agency (such as a withholding agency, an unemployment agency, a filing agency, and/or a payment agency). Over time, the financial information provides a financial history for the user, which includes multiple transactions with multiple commercial establishments (such as items purchased from vendors).

Based on the financial history, one or more commercial offers (such as discounts or electronic coupons) may be presented to the user. For example, one or more icons corresponding to the one or more commercial offers may be presented in the financial software and/or in another application (using an optional widget or frame-based icon that is presented in the other application). Moreover, the user can pursue one of the commercial offers by interacting with the corresponding icon (for example, by activating or clicking on one of the icons).

In an exemplary embodiment, the financial information available to the financial software is used to build a financial history for the user that includes a spending history as a function of time (such as where the user has gone and what the user has done). Consequently, in some embodiments the financial history includes information associated with: spending on items, categories associated with the items (such as entertainment or travel), spending patterns, and/or the commercial establishments that provided the items.

This financial history may include a variety of data that facilitates determining which commercial offers are relevant to the user. In particular, the financial history may include: long-term data (such as annual or semi-annual temporal patterns), lifetime events, and/or spending behavior patterns (which may build a deep, long-term understanding of the user's behavior). For example, commercial offers may be provided based on a timing of an annual vacation or the purchase of a crib (i.e., that it is likely that the user just had a baby). Moreover, users may be classified based on similar behaviors and commercial offers may be based on this classification. Thus, in some embodiments a user may be offered discounts on telecommunication services based on how much the user is spending relative to other users in the area.

In some embodiments, commercial offers are targeted based on a wish list of items for which the user would like to receive a commercial offer, i.e., things the user wants. In this way, users may generate competition for their business. Note that these wish-lists may attract new commercial entities (which do not previously provide commercial offers using the computer system 100) to start using the computer system 100 to identify and target potential customers.

Note that the icons corresponding to the commercial offers may embody one or more characteristics, which the user may associate with a personality or personality attribute (such as spunk). In this way, the icons may be a friendly way of making commercial offers (as opposed to just saving the user money). Consequently, in some embodiments the icons combine relevancy with a behavior, such as an animated behavior that is personalized and/or time-dependent. These features may help improve the user's experience when viewing and/or interacting with the one or more icons by effectively making the data associated with the commercial offers lively.

In some embodiments, the animated behavior includes: a change of color of a given icon, a change of shape of the given icon, a change in the magnification of the given icon (such as by zooming in or out from the given icon), and/or a type of motion of the given icon. In an exemplary embodiment, the given icon may: grow in size, shake from side to side, expand and contract, and/or fade out slowly (over several seconds). For example, the given icon may bounce up and down or shake like a dog when the information associated with the given icon (i.e., the corresponding commercial offer) is refreshed.

Moreover, the animated behavior may be based, at least in part, on: feedback from the user (such as whether or not the user liked the given commercial offer), a state of the commercial offer, and/or a characteristic or personality trait associated with the commercial offer. For example, the state may include: a time remaining to accept a given commercial offer, an estimated relevancy of the given commercial offer to the user, and/or one or more categories associated with the given commercial offer.

Figure 4A:
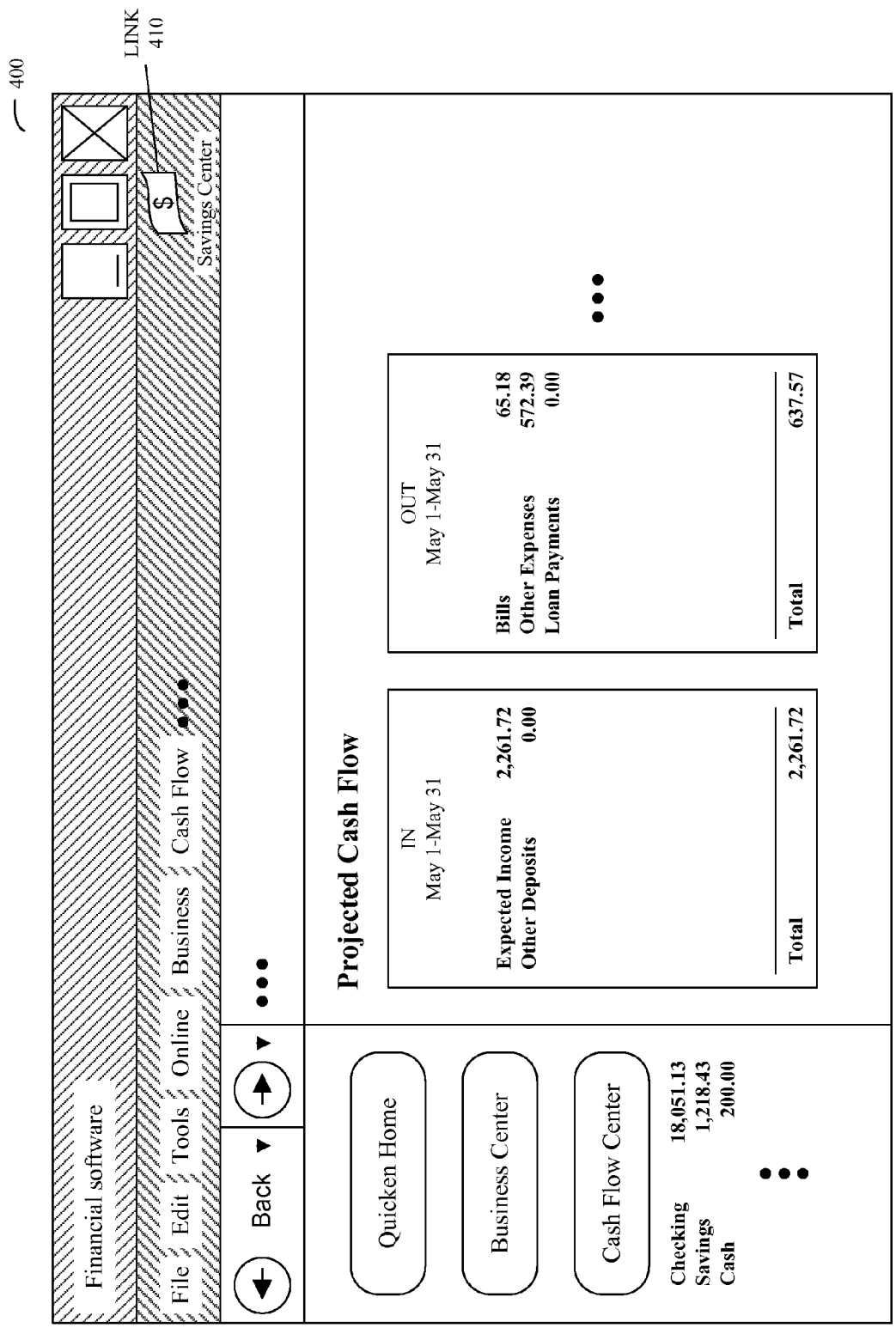
FIG. 4A is a block diagram illustrating a screen shot of a user interface in an embodiment of the present invention.

As discussed further below with reference to FIGS. 4A-4C, in some embodiments the icons are included in an embedded slide show or video in the financial software. Moreover, in some embodiments the icons are included in: a taskbar in the financial software, a grid that displays multiple icons in the financial software (where the given icon is associated with the given commercial offer), a side bar, a widget, a tray, and/or a pop-up window. Note that at least some of the commercial offers may be supplied to the financial software by an external provider (such as an advertising agency).

In some embodiments, the commercial offers are provided on a website that the user is directed to when the user starts the financial software. Moreover, in some embodiments the commercial offers are provided as alerts which may be provided as needed, which may include when the user is not using the financial software.

In some embodiments the computer system 100 includes fewer or additional components. Moreover, two or more components can be combined into a single component, and/or a position of one or more components may be changed. For example, in some embodiments the computer 110 is a portable electronic device (such as a cellular telephone). In some embodiments, the commercial offers may be targeted based on a position of the computer 110 or the proximity of the computer 110 to a position, for example, by using GPS or a near-field wireless technology.

While financial information has been used as an illustrative example, in other embodiments these techniques for providing commercial offers may additionally be based on medical information associated with the user. In these embodiments, the medical information may be provided by the user and/or may be aggregated from multiple health care providers, such as a hospital, a pharmacy, a doctor, and/or an insurance company.

Figure 2:
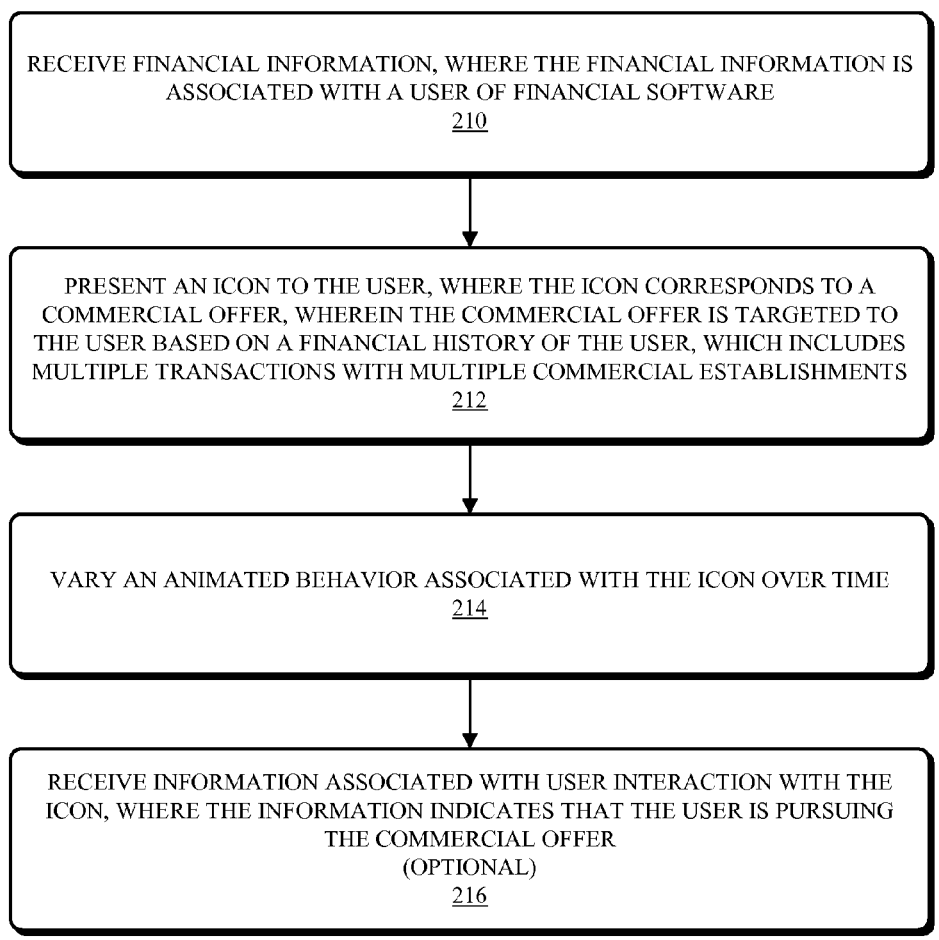
FIG. 2 is a flow chart illustrating a method for providing commercial offers in accordance with an embodiment of the present invention.

We now discuss methods for providing commercial offers. More specifically, FIG. 2 presents a flow chart illustrating an embodiment of a method 200 for providing commercial offers, which may be implemented in a computer system, such as the computer system 100 in FIG. 1. During operation, this computer system receives financial information associated with a user of financial software (210). Then, the computer system presents an icon corresponding to a commercial offer to the user (212). This commercial offer is targeted to the user is based on a financial history of the user, which includes multiple transactions with multiple commercial establishments. Note that the financial history includes the financial information.

Next, the computer system varies an animated behavior of the icon over time (214). Moreover, the computer system may optionally receive information associated with the user's interaction with the icon (216), where the information indicates that the user is pursuing the commercial offer.

Note that in some embodiments of the method 200 there may be: additional or fewer operations; the order of the operations may be changed; and two or more operations may be combined into a single operation.

Figure 3:
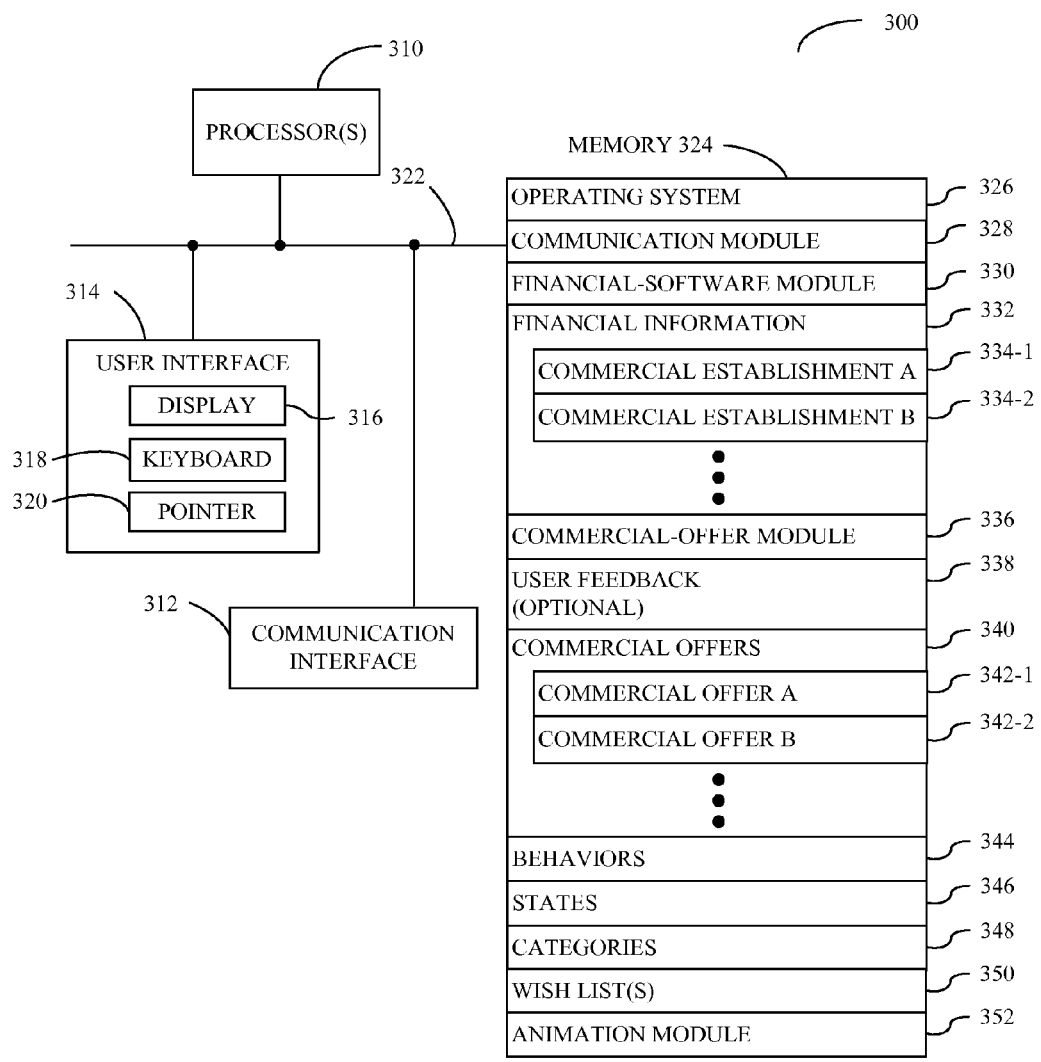
FIG. 3 is a block diagram illustrating a computer system in accordance with an embodiment of the present invention.

We now describe computer systems for implementing these techniques. FIG. 3 presents a block diagram illustrating an embodiment of a computer system 300. Computer system 300 includes: one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, FLASH, one or more smart cards, one or more magnetic disc storage devices, and/or one or more optical storage devices. Memory 324 may store an operating system 326 that includes procedures (or a set of instructions) for handling various basic system services for performing hardware dependent tasks. While not shown in the computer system 100, in some embodiments memory 324 includes a browser. Memory 324 may also store communication procedures (or a set of instructions) in a communication module 328. These communication procedures may be used for communicating with one or more computers and/or servers, including computers and/or servers that are remotely located with respect to the computer system 300.

Memory 324 may include multiple program modules (or a set of instructions), including financial-software module 330 (or a set of instructions), commercial-offer module 336 (or a set of instructions), and/or animation module 352 (or a set of instructions). Commercial-offer module 336 may use financial information 332 (such as that associated with commercial establishment A 334-1 and/or commercial establishment B 334-2) to provide one or more commercial offers 340 (such as commercial offer A 342-1 and/or commercial offer B 342-2) to a user of the financial-software module 330 in the form of one or more icons presented on display 316. In some embodiments, the one or more commercial offers 340 that are provided are based on items in one or more wish lists 350 and/or on optional user feedback 338 (such as which previous commercial offers the user accepted, liked, and/or disliked).

Moreover, animation module 352 may generate time-dependent animated behaviors associated with the displayed one or more icons. These animated behaviors may be based on one or more behaviors 344, one or more categories 348, and/or one or more states 346 associated with the one or more commercial offers 340.

Instructions in the various modules in the memory 324 may be implemented in a high-level procedural language, an object-oriented programming language, and/or in an assembly or machine language. The programming language may be compiled or interpreted, i.e., configurable or configured to be executed by the one or more processing units 310.

Although the computer system 300 is illustrated as having a number of discrete components, FIG. 3 is intended to provide a functional description of the various features that may be present in the computer system 300 rather than as a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more ASICs and/or one or more digital signal processors DSPs.

Computer system 300 may include: fewer components or additional components, two or more components may be combined into a single component, and/or a position of one or more components may be changed. In some embodiments the functionality of the computer system 300 may be implemented more in hardware and less in software, or less in hardware and more in software, as is known in the art.

We now describe embodiments of graphical user interfaces for use in presenting icons, and thus, the commercial offers. FIG. 4A presents a block diagram illustrating an embodiment of a screen shot of a user interface 400 in a financial software application. This user interface includes a link 410 to a savings center or page.

Figure 4B:
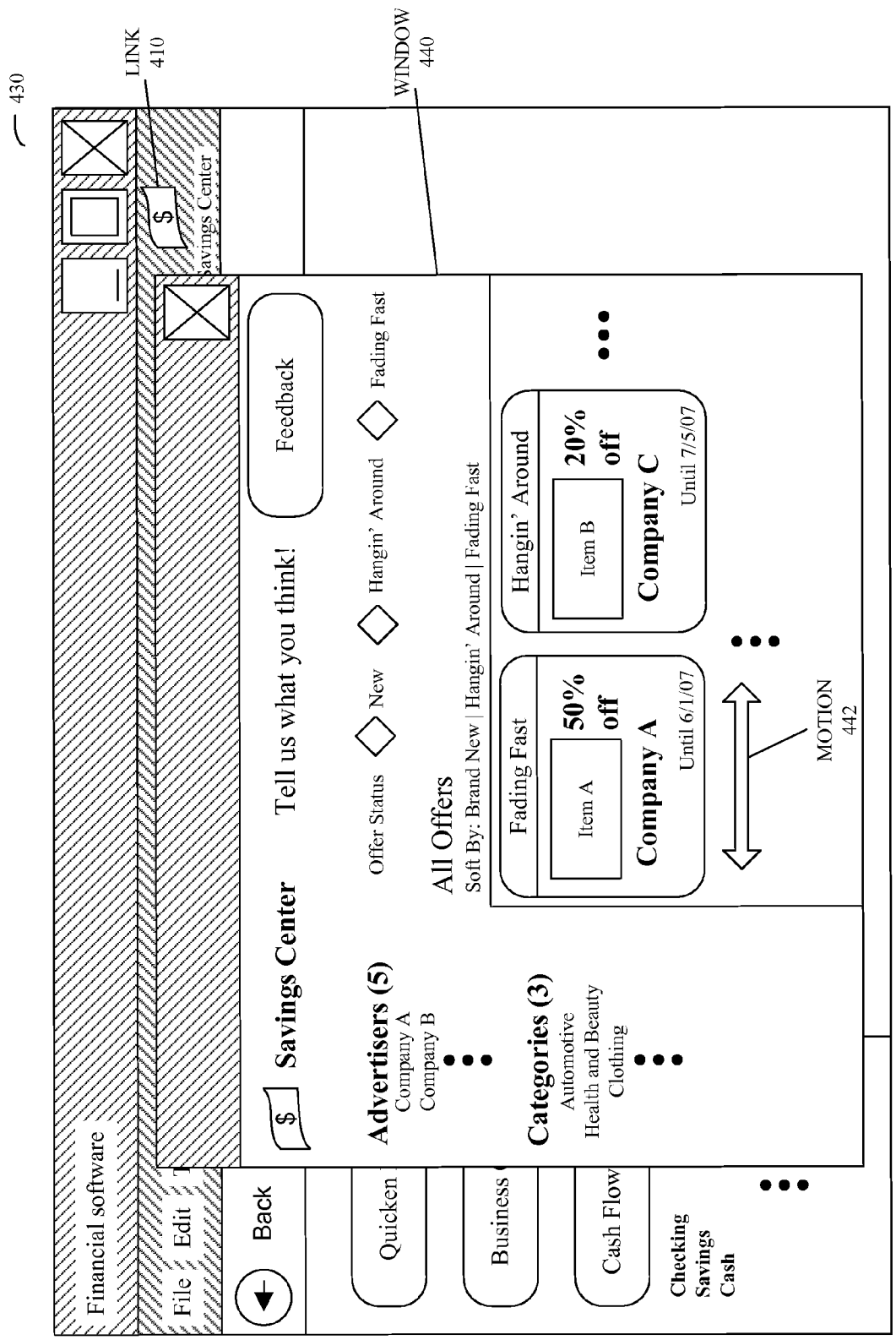
FIG. 4B is a block diagram illustrating a screen shot of a user interface in an embodiment of the present invention.
Figure 4C:
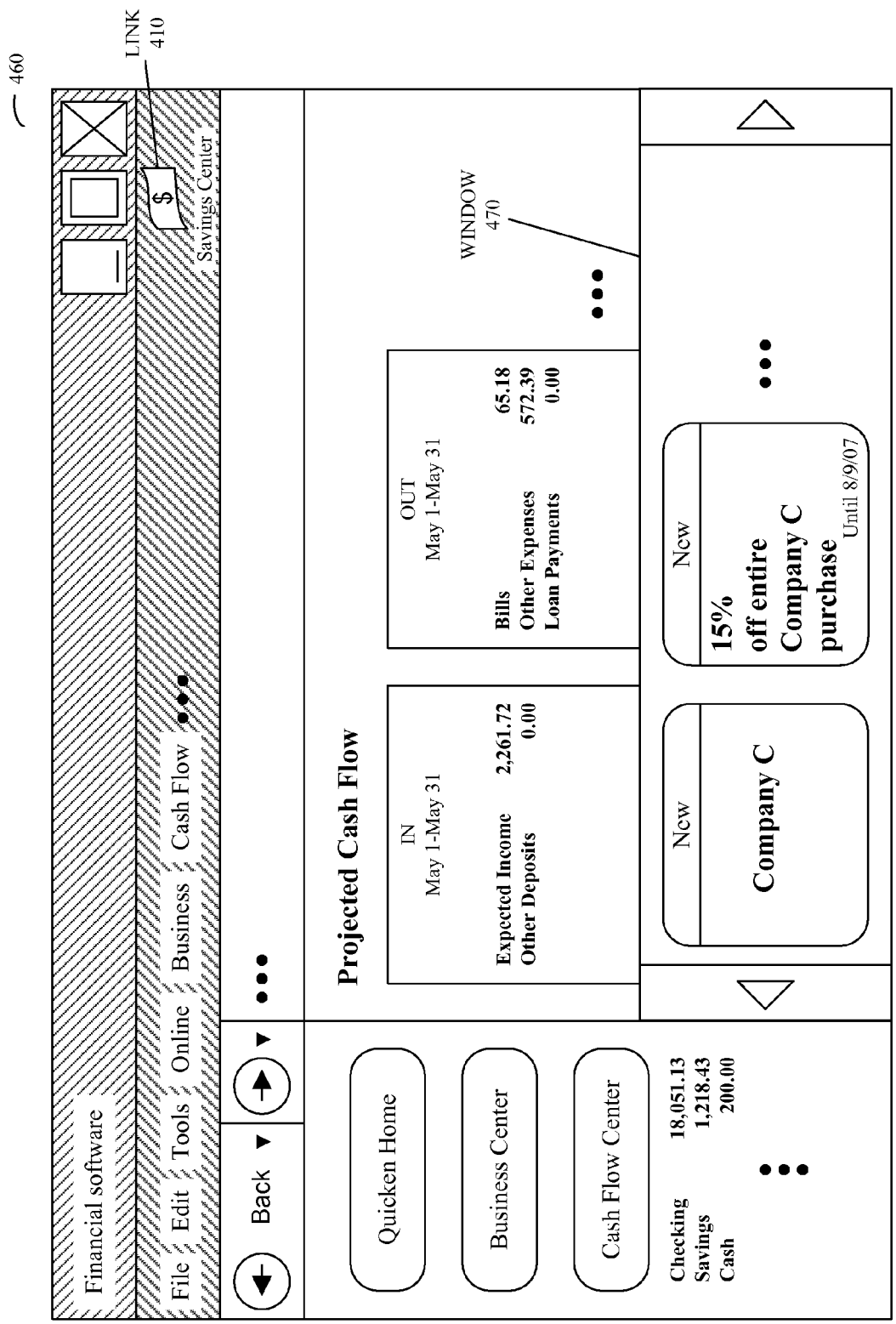
FIG. 4C is a block diagram illustrating a screen shot of a user interface in an embodiment of the present invention.

As shown in FIG. 4B, which presents a block diagram illustrating an embodiment of a screen shot of a user interface 430, when the user activates the link 410 a window 440 is displayed. This window may include multiple icons corresponding to commercial offers. In some embodiments, these icons are arranged on a grid.

In some embodiments, the window 440 includes controls that allow the user to sort the commercial offers based on freshness. For example, the freshness may indicate whether the commercial offers are brand new commercial offers, commercial offers that are hangin' around, and/or commercial offers that are fading fast, i.e., that are about to expire). Moreover, the commercial offers may be sorted based on a category and/or a company that is providing at least some of the commercial offers. Note that different subsets of icons may be associated with different time-varying animated behaviors. Thus, commercial offers that are fading fast (for example, those within 24 hours of expiration) may have a common color and may have an associated motion 442. Alternatively, the icons may exhibit the animated behavior (such as the motion 442) when the user chooses to sort the offers using the controls in the window 440.

In some embodiments, the icons or a preview of the icons are embedded in the main page in the financial software. This is illustrated in FIG. 4C, which presents a block diagram illustrating an embodiment of a screen shot of a user interface 460. In this example, the icons are included in a window 470 at the bottom of the main page. Note that in some embodiments the commercial offers are included as a video or rich media (such as flash) in the financial software.

In some embodiments, user interface 400 (FIG. 4A), user interface 430 (FIG. 4B), and/or user interface 460 include fewer or additional components. Moreover, two or more components may be combined into a single component and/or a position of one or more components may be changed.

We now describe data structures that may be used in the computer system 100 (FIG. 1) and/or 300 (FIG. 3). FIG. 5 presents a block diagram illustrating an embodiment of a data structure 500. This data structure may include information for one or more commercial offers 510. A given commercial offer, such as commercial offer 510-1, may include: a time stamp 512-1, one or more categories 514-1, one or more states 516-1, one or more colors 518-1 associated with the one or more states 516-1, and/or one or more motions 520-1 associated with the one or more states 516-1.

FIG. 6 presents a block diagram illustrating an embodiment of a data structure 600. This data structure may include financial information 610. Given financial information, such as financial information 610-1, may include a time stamp 612-1. Financial information 610-1 may also indicate: a financial transaction 614-1, one or more items purchased 616-1 during the financial transaction 614-1, one or more commercial establishments 618-1 with which the financial transaction 614-1 occurred, and/or one or more categories 620-1 associated with the one or more items purchased 616-1.

Note that that in some embodiments of the data structures 500 (FIG. 5) and/or 600 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for providing commercial offers, comprising:
   receiving financial information associated with a user of financial software, wherein the financial information includes multiple financial transactions of the user with multiple commercial establishments;
   determining a financial history for the user based on the received financial information;
   determining, by a computer, a plurality of commercial offers that are targeted to the user based on the financial history of the user;
   generating a plurality of interactive animated icons, wherein each interactive animated icon represents a corresponding commercial offer targeted to the user;
   associating a time-varying behavior of an icon with an expiration deadline for the corresponding commercial offer;
   grouping the plurality of interactive animated icons into subsets based on their associated expiration deadlines, wherein each subset of interactive animated icons has a common expiration deadline; the grouped subsets of the plurality of interactive animated icons; and
   wherein the user accepts a commercial offer by interacting with an icon.

2. The method of claim 1, wherein the financial information is provided by the user.

3. The method of claim 1, wherein the financial information is provided by a financial institution.

4. The method of claim 1, wherein the financial institution includes a credit card company or a bank.

5. The method of claim 1, wherein the animated behavior includes a change of color.

6. The method of claim 1, wherein the animated behavior includes a type of motion.

7. The method of claim 1, wherein the animated behavior is based, at least in part, on feedback from the user.

8. The method of claim 1, wherein the financial history includes information associated with: spending on items, categories associated with the items, spending patterns, or the commercial establishments that provided the items.

9. The method of claim 1, wherein the icon is included in an embedded slide show or video in the financial software.

10. The method of claim 1, wherein the icon is included in a taskbar in the financial software.

11. The method of claim 1, wherein the financial software includes Quicken™, QuickBooks™ or TurboTax™.

12. The method of claim 1, wherein the commercial offer is based on a wish list of items for which the user would like to receive a commercial offer.

13. The method of claim 1, wherein the animated behavior is further associated with a state of the commercial offer.

14. The method of claim 13, wherein the state includes an estimated relevancy of the commercial offer to the user.

15. The method of claim 13, wherein the state includes one or more categories associated with the commercial offer.

16. The method of claim 1, further comprising enabling a user to sort the plurality of the commercial offers based on a time associated with each of the commercial offers.

17. The method of claim 1, further comprising enabling a user to sort the plurality of the commercial offers based one or more of a category or a company associated with each of the offer.

18. A computer program product for use in conjunction with a computer system, the computer program product comprising a computer-readable storage medium and a computer-program mechanism embedded therein for providing commercial offers, the computer-program mechanism including:
   instructions for receiving financial information associated with a user of financial software, wherein the financial information includes multiple financial transactions of the user with multiple commercial establishments;
   instructions for determining a financial history for the user based on the received financial information;
   instructions for determining a plurality of commercial offers that are targeted to the user based on the financial history of the user;
   instructions for generating a plurality of interactive animated icons, wherein each interactive animated icon represents a corresponding commercial offer targeted to the user;
   instructions for associating a time-varying behavior of an icon with an expiration deadline for the corresponding commercial offer;
   instructions for grouping the plurality of interactive animated icons into subsets based on their associated expiration deadlines, wherein each subset of interactive animated icons has a common expiration deadline;
   displaying the grouped subsets of the plurality of interactive animated; and
   wherein the user accepts a commercial offer by interacting with an icon.

19. A computer system to provide commercial offers, comprising:
   a processor;
   memory;
   a program module, wherein the program module is stored in the memory and configurable to be executed by the processor, the program module including:
      instructions for receiving financial information associated with a user of financial software, wherein the financial information includes multiple financial transactions of the user with multiple commercial establishments;
      instructions for determining a financial history for the user based on the received financial information;
      instructions for determining a plurality of commercial offers that are targeted to the user based on the financial history of the user;
      instructions for generating a plurality of interactive animated icons, wherein each interactive animated icon represents a corresponding commercial offer targeted to the user;

instructions for associating a time-varying behavior of an icon with an expiration deadline for the corresponding commercial offer;

instructions for grouping the plurality of interactive animated icons into subsets based on their associated expiration deadlines, wherein each subset of interactive animated icons has a common expiration deadline;

displaying the grouped subsets of the plurality of interactive animated icons; and wherein the user accepts a commercial offer by interacting with an icon.

\* \* \* \* \*